US005206669A

United States Patent [19]

Genovese

[11] Patent Number: 5,206,669

[45] Date of Patent: Apr. 27, 1993

[54] APPARATUS AND METHOD FOR SELECTIVELY DELIVERING AN ION STREAM

[75] Inventor: Frank C. Genovese, Fairport, N.Y.

[73] Assignee: Xerox Corporation, Stamford, Conn.

[21] Appl. No.: 801,292

[22] Filed: Dec. 2, 1991

[51] Int. Cl.[5] .......... G01D 15/06

[52] U.S. Cl. .......... 346/159; 346/155

[58] Field of Search .......... 346/155, 159, 158; 361/233; 315/111.81, 111.91

[56] References Cited

U.S. PATENT DOCUMENTS

| | | | |
|---|---|---|---|
| 3,473,074 | 10/1969 | Joannou . | |
| 3,673,598 | 6/1972 | Simm et al. . | |
| 4,435,066 | 3/1984 | Tarumi et al. . | |
| 4,463,363 | 7/1984 | Gundlach et al. . | |
| 4,495,508 | 1/1985 | Tarumi et al. | 346/159 |
| 4,524,371 | 6/1985 | Sheridon et al. . | |
| 4,538,163 | 8/1985 | Sheridon et al. . | |
| 4,644,373 | 2/1987 | Sheridon et al. . | |
| 4,737,805 | 4/1988 | Weisfield et al. . | |
| 4,972,212 | 11/1990 | Hauser et al. . | |
| 4,973,994 | 11/1990 | Schneider | 346/159 |
| 4,985,716 | 1/1991 | Hosaka et al. | 346/159 |
| 4,996,425 | 2/1991 | Hauser et al. | 346/159 X |
| 5,083,145 | 1/1992 | Gundlach et al. | 346/159 |

*Primary Examiner*—Benjamin R. Fuller
*Assistant Examiner*—Randy W. Gibson
*Attorney, Agent, or Firm*—Finnegan, Henderson, Farabow, Garrett & Dunner

[57] ABSTRACT

A print head for an ionographic printing system, including a multiple pluralities of modulation electrodes for modulating an ion stream generated by the print head, and multiple correction electrodes. Each correction electrode is located in proximity to one of the pluralities of modulation electrodes.

15 Claims, 11 Drawing Sheets

APPARATUS AND METHOD FOR SELECTIVELY DELIVERING AN ION STREAM

BACKGROUND OF THE INVENTION

The present invention relates generally to an apparatus and method for selectively delivering an ion stream and, more particularly, to such an apparatus and method for controlling uniformity between element output in a multi-element iongraphic print head.

In ionographic devices such as those described in U.S. Pat. No. 4,524,371 to Sheridon et al., or U.S. Pat. No. 4,463,363 to Gundlach et al., an ion producing device generates ions to be directed past modulation electrodes to an imaging surface in imagewise configuration. In one type of ionographic device, ions are produced at a coronode supported within an ion chamber, and a moving fluid stream carries the ions out of the chamber. At the chamber exit, a plurality of modulation electrodes are modulated with a control voltage to selectively control passage of ions through the chamber exit. Ions directed through the chamber exit are deposited on a charge retentive surface in imagewise configuration to form an electrostatic latent image developable by electrostatographic techniques for subsequent transfer to a final substrate, such as a sheet of paper. The arrangement produces a high resolution, non-contact printing system. Other types of ionographic devices exist that operate similarly, but do not rely on a moving fluid stream to carry ions to a surface.

Although the device may be fabricated with a high quality process, there is typically a measurable nonuniformity among the ion outputs associated with each modulation electrode. Part of the nonuniformity may be caused by variations in the chamber exit width and air flow velocity along the length of the chamber exit. Further, because the typical width of the chamber exit is only three to six one-thousandth of an inch, contaminants typically found in room air, such as organics and combustion byproducts can be deposited at particular portions of the exit, reducing ion flow through one or more physical mechanisms.

Publications of general interest include U.S. Pat. No. 4,467,333 issued to Seimiya et al., which discloses an ion control electrode and a common electrode arranged to face each other through an insulating layer; U.S. Pat. No. 3,473,074 to Joannou, which discloses a print-drum confronted by an array of "mosaic" ground electrodes; U.S. Pat. No. 3,673,598 to Simm et al., which discloses image-wise controlled charging of an insulating recording material; and U.S. Pat. No. 4,435,066 to Tarumi et al., which discloses a common electrode and an optional ion flow condenser electrode.

SUMMARY OF THE INVENTION

Thus, it is an object of the present invention to provide an apparatus for controlling the uniformity of ion flow in a multielement ion stream delivery system.

To achieve this and other objects of the present invention, an apparatus for selectively delivering ion currents comprises means for defining a first surface; a first plurality of electrodes arranged on the first surface; a second plurality of electrodes arranged on the first surface and adjacent to the first plurality of electrodes; means for defining a second surface, opposed to the first and second pluralities of electrodes to define a channel therebetween, a first correction electrode, sufficiently close to each electrode in the first plurality of electrodes such that, within the channel, an electric field generated by the first correction electrode substantially coincides with an electric field generated by each electrode in the first plurality of electrodes; and a second correction electrode, sufficiently close to each electrode in the second plurality of electrodes such that, within the channel, an electric field generated by the second correction electrode substantially coincides with an electric field generated by each electrode in the second plurality of electrodes.

According to another aspect of the present invention, an apparatus for selectively delivering ion currents comprises means for defining a first surface; a first charge holding means arranged on the first surface; a second charge holding means adjacent to the first charge holding means on the first surface; means for defining a second surface, opposed to the first surface to define a channel therebetween, first means for charging the first charge holding means to one of a first set of voltage values and for charging the second charge holding means to one of the first set of voltage values; a third charge holding means, sufficiently close to the first charge holding means such that, within the channel, an electric field generated by the third charge holding means substantially coincides with an electric field generated by the first charge holding means; a fourth charge holding means, sufficiently close to the second charge holding means such that, within the channel, an electric field generated by the fourth charge holding means substantially coincides with an electric field generated by second charge holding means; and second means for charging the third charge holding means to one of a second set of voltage values, a size of the second set of voltage values being larger than a size of the first set of voltage values, and for charging the fourth charge holding means to one of the second set of voltage values.

According to yet another aspect of the present invention, an apparatus for selectively delivering ion currents comprises means for defining a surface; a first plurality of electrodes arranged on the surface; a second plurality of electrodes arranged on the surface and adjacent to the first plurality of electrodes; a first correction electrode, opposed to the first plurality of electrodes; and a second correction electrode, opposed to the second plurality of electrodes.

According to yet another aspect of the present invention, a method of operating an apparatus for selectively delivering ion currents, the apparatus having a first surface, first charge holding means on the first surface, a second charge holding means adjacent to the first charge holding means on the first surface, a second surface, opposed to the first surface to define a channel therebetween, a third charge holding means sufficiently close to the first charge holding means such that, within the channel, an electric field generated by the third charge holding means substantially coincides with an electric field generated by the first charge holding means, and a fourth charge holding means, sufficiently close to the second charge holding means such that, within the channel, an electric field generated by the fourth charge holding means substantially coincides with an electric field generated by the second charge holding means, the method comprising the steps of charging the first charge holding means to one of a first set of voltage values; charging the second charge holding means to one of the first set of voltage values; charging the third charge holding means to one of a second set of voltage values, the second set of voltage values being larger than the first set of voltage values; and charging the fourth charge holding means to one of the second set of voltage values. The accompanying drawings, which are incorporated in and which constitute a part of this specification, illustrate preferred embodiments of the invention and, together with the description, explain the principles of the invention.

DETAILED DESCRIPTION OF THE PREFERRED EMBODIMENTS

Figure 1:
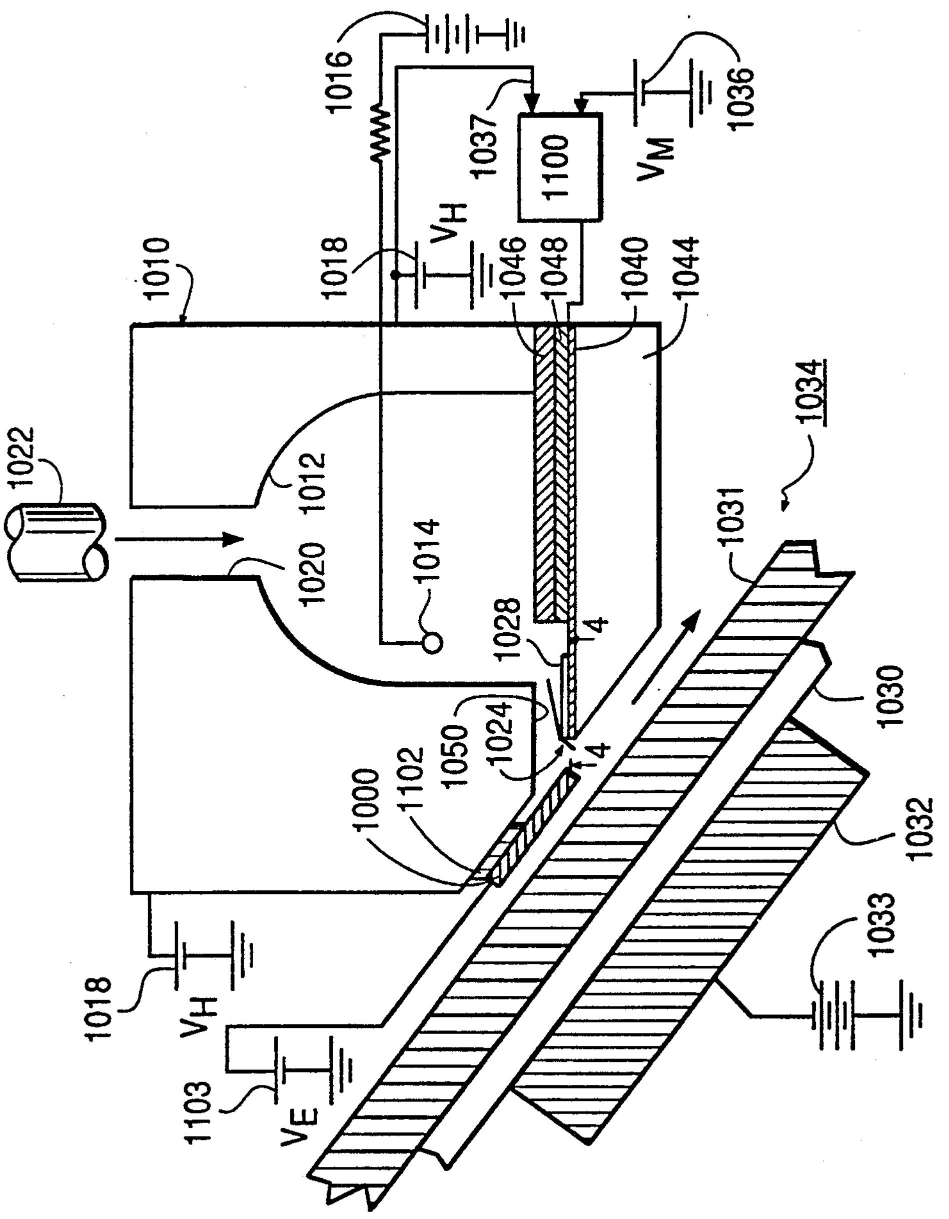
FIG. 1 is a largely schematic side elevation in partial cross-section depicting an ionographic print system.

FIG. 1 illustrates the general structure of an ionographic print head according to the preferred embodiments of the present invention. Within a head 1010 is an ion generation region including an ion chamber 1012, a coronode 1014 supported within the chamber, a high potential source 1016, on the order of several thousand volts D.C., applied to coronode 1014, and a reference potential source 1018, connected to the wall of chamber 1012, maintaining head 1010 at voltage $V_H$.

The corona discharge around coronode 1014 creates a source of ions of a given polarity (preferably positive), which are attracted to the chamber wall held at $V_H$ and fill the chamber with space charge. An inlet channel 1020 to ion chamber 1012 delivers pressurized air into chamber 1012 from a suitable source, schematically illustrated by tube 1022. Air flows out of ion chamber 1012 to the exterior of head 1010 through modulation channel 1024. As the air passes through ion chamber 1012, it carries ions into modulation channel 1024, past modulation electrodes 1028. The interior of ion chamber 1012 may be provided with a coating that is inert to the highly corrosive corona byproducts produced therein.

Ions allowed to pass out of head 1010, through modulation channel 1024, and directed to charge receptor 1034, come under the influence of a conductive plate 1030, provided as a backing layer to a charge receptor dielectric surface 1031, with conductive plate 1030 slidingly connected via a shoe 1032 to a voltage supply 1033. Alternatively, a single layer dielectric charge receptor might be provided, passing a biased back electrode to the same effect. Subsequently the latent image charge pattern may be made visible by suitable development apparatus (not shown).

Once ions have been swept into modulation channel 1024 by the transport fluid, the ion-laden fluid stream is rendered intelligible. This rendering is accomplished by individually switching modulation electrodes 1028 in modulation channel 1024, between a blocking voltage source 1036 and a reference potential 1037 by means of a switch within controller 1100. Gray levels may be provided by supplying a continuously variable voltage signal to the modulation electrodes.

Modulation electrodes 1028 together with opposite wall 1050, held at $V_H$, constitute a capacitor, across which the voltage potential of source 1036, may be applied, when connected through controller 1100. Thus, an electric field, extending in a direction transverse to the direction of the air flow, is selectively established between a given modulation electrode 1028 and the opposite wall 1050.

Writing of a selected spot is accomplished by connecting a selected modulation electrode to reference potential source 1037, held at $V_H$ so that the ion stream, passing between the electrode and its opposite wall, will not be under the influence of a traverse field therebetween and air passing through the channel opposite the modulation electrode will carry the writing ions into the region influenced by electrode 1030 where they can accumulate on the desired spot of the image receptor sheet. Conversely, ion flow will be blocked and no writing will be effected when a sufficiently high voltage is applied to an electrode. This blocking is accomplished by connecting one of the modulation electrodes to the potential of source 1036 via controller 1100 so as to impose upon the electrode a charge of the same sign as the ionic species. An ion stream will be repelled and be driven into contact with the opposite, conductive wall 1050 where the ions neutralize into uncharged, or neutral air molecules. Thus, an imagewise pattern of information is formed by selectively controlling each of the modulation electrodes so that the ion streams associated therewith either exit or are inhibited from exiting the housing, as desired.

As an alternative to an ionographic printing head with fluid jet assisted ion flow, other ionographic print heads may be provided where the ion stream is directed to the charge receptor solely by electromagnetic fields. Further, while the description herein assumes positive ions, appropriate changes may be made so that negative ions may be used.

The minimum potential $V_M$ producing ion flow cutoff is a function of factors such as the density of ions being produced by coronode 1014, the position of the coronode within the ion chamber 1012, the distribution of electric field lines within the ion chamber, the air flow rate, the electrode geometry within the modulation channel, the electrode length and width, and the spacing of the electrodes from opposing wall 1050. $V_M$ is also affected by the work function of the materials used in the fabrication of the electrodes and the opposing surface and changes in the effective work function due to contaminants on these surfaces, a process that has not been well quantified. The relationship between the potential applied to the electrodes and the resulting ion current level is also dependent on these factors.

When a sufficiently high potential is applied to modulation electrodes 1028, ion flow through modulation channel 1024 to receiver surface 1031 is completely blocked and further increases in the applied potential have no additional effect. At lesser potentials, ion flow is partially blocked, resulting in intermediate values of ion flow through modulation channel 1024 and corresponding intermediate charging of receiver surface 1031. This partial blocking is exploited to produce intermediate charging levels to produce intermediate grey levels of optical density instead of just black and white. Although intermediate density printing is generally referred to as "grey level printing", this type of printing can be used to produce intermediate pastels using color toner, as well as grey using black toner.

The relation between ion current is a continuously decreasing nonlinear function of the value of the applied voltage. Because this relation is nonlinear, printing with equal density increments generally requires electrode modulation potentials that are not proportioned equally.

The preferred embodiments of the present invention implement grey level printing by supplying voltages, to the individual modulation electrodes 1028, that are intermediate between the reference voltage $V_H$ and a threshold value of $V_M$ corresponding to the minimum blocking or cutoff potential for electrodes 1028.

In general, the number of intermediate grey levels depends on the number of distinct operating points that can be assigned to the modulation electrodes. For a digitally controlled system, the total number of operating points is $2^N$ where N is the number of controlling bits used in the controller design. Although the number of operating points increase exponentially with N, the differences in printing density between adjacent operating points become indistinguishable. In the preferred embodiments of the invention, two data bits are used, corresponding to four operating points: off, $\frac{1}{3}$ on, $\frac{2}{3}$ on, and 3/3 on. It has been shown experimentally that 4 density levels results in a marked reduction in the perceived edge roughness of text characters. In addition, combining 4 level printing with halftoning substantially reduces the harsh density contouring problem associated with low resolution halftoned pictorial images.

Modulation electrodes 1028 are arranged on a thin film electronic switching and distribution structure 1040 supported on a planar insulating substrate 1044 between the substrate and a conductive plate 1046, and insulated from the conductive plate by an insulating layer 1048. Thin film techniques are preferred in fabricating the electronic structure 1040 because these methods have the advantages of simplicity and economy in producing complex electronic structures over a large physical area. Thin film silicon, in either the amorphous, polycrystalline or microcrystalline forms, is preferred for fabricating the active switching devices in the structure of layer 1040.

The relatively low temperature of the amorphous silicon and polysilicon fabrication processes allows a large degree of freedom in the choice of substrate materials, enabling the use of inexpensive amorphous materials such as glass, ceramics and possibly some types of printed circuit board materials.

Figure 2:
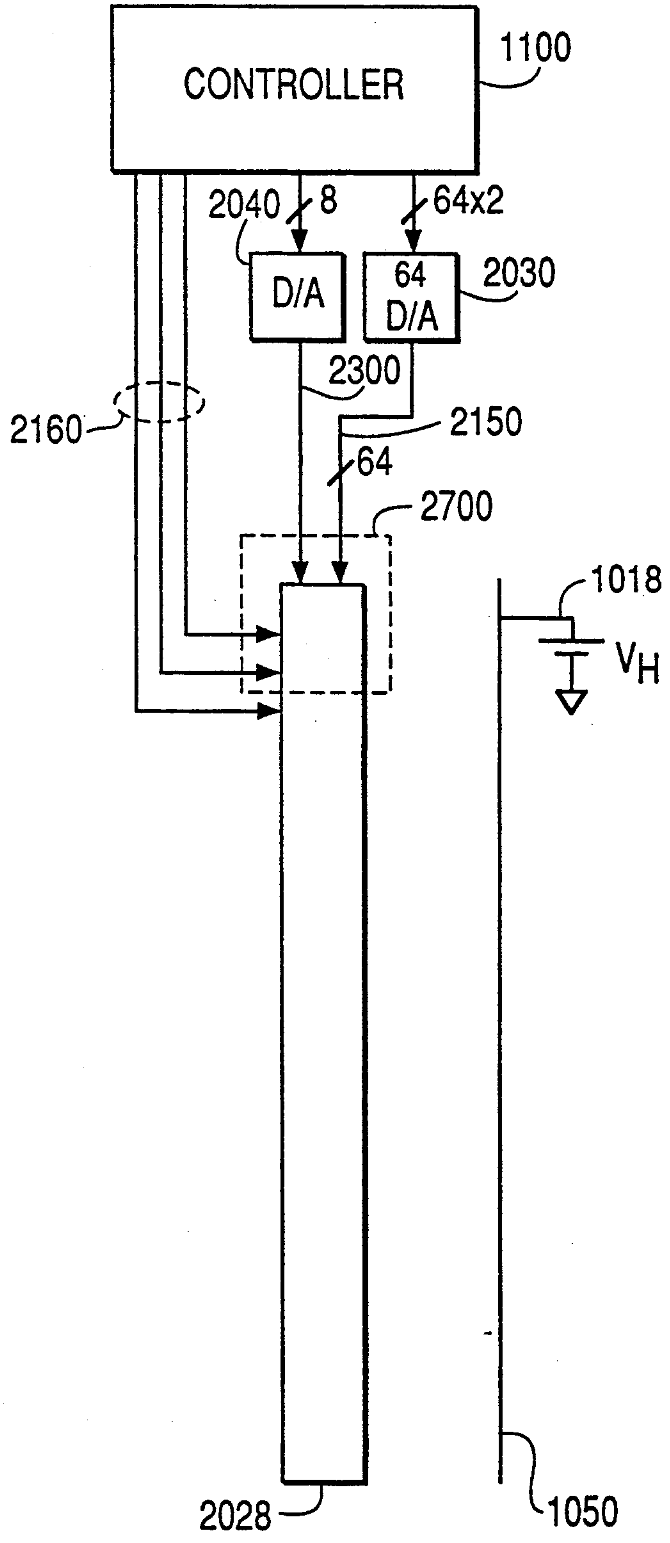
FIG. 2 is a diagram of a system for controlling electrodes according to the preferred embodiments of the invention.

The combination of modulation electrodes 1028, thin film distribution structure 1040, and switching electronics network fabricated on the planar insulating substrate 1044 will be referred to as a "modulation bar", labeled 2028 in FIG. 2. FIG. 2 illustrates an architecture for controlling modulation electrodes in modulation bar 2028, for 4 level gray printing applications according to the preferred embodiments of the present invention. Among the figures, corresponding elements are labeled with corresponding reference numbers.

Modulation bar 2028 includes 2560 modulation electrodes evenly spaced across the length of the bar and organized in 40 groups of 64 elements for electronic control convenience. The length of the bar is approximately the width of a sheet of paper. Controller 1100 includes a microprocessor, access to bit pattern image data to be printed, and various registers for buffering data. Controller 1100 sends 64 two bit values, corresponding to 64 adjacent modulation electrodes, to 64 digital-to-analog (D/A) converters 2030. D/A converters 2030 then send 64 analog voltages over data bus 2150 to modulation bar 2028. Forty select lines 2160 determine which group of 64 electrodes receives data currently on data bus 2150.

Controller 1100 also sends a single 8 bit value to D/A converter 2040. D/A converter 2040 then sends an analog voltage over line 2300 to modulation bar 2028. As described in more detail below, the various voltages sent over line 2300 apply a piecewise correction for ion flow inequalities between each group of 64 contiguous modulation electrodes and the 39 other groups of modulation electrodes.

Figure 3:
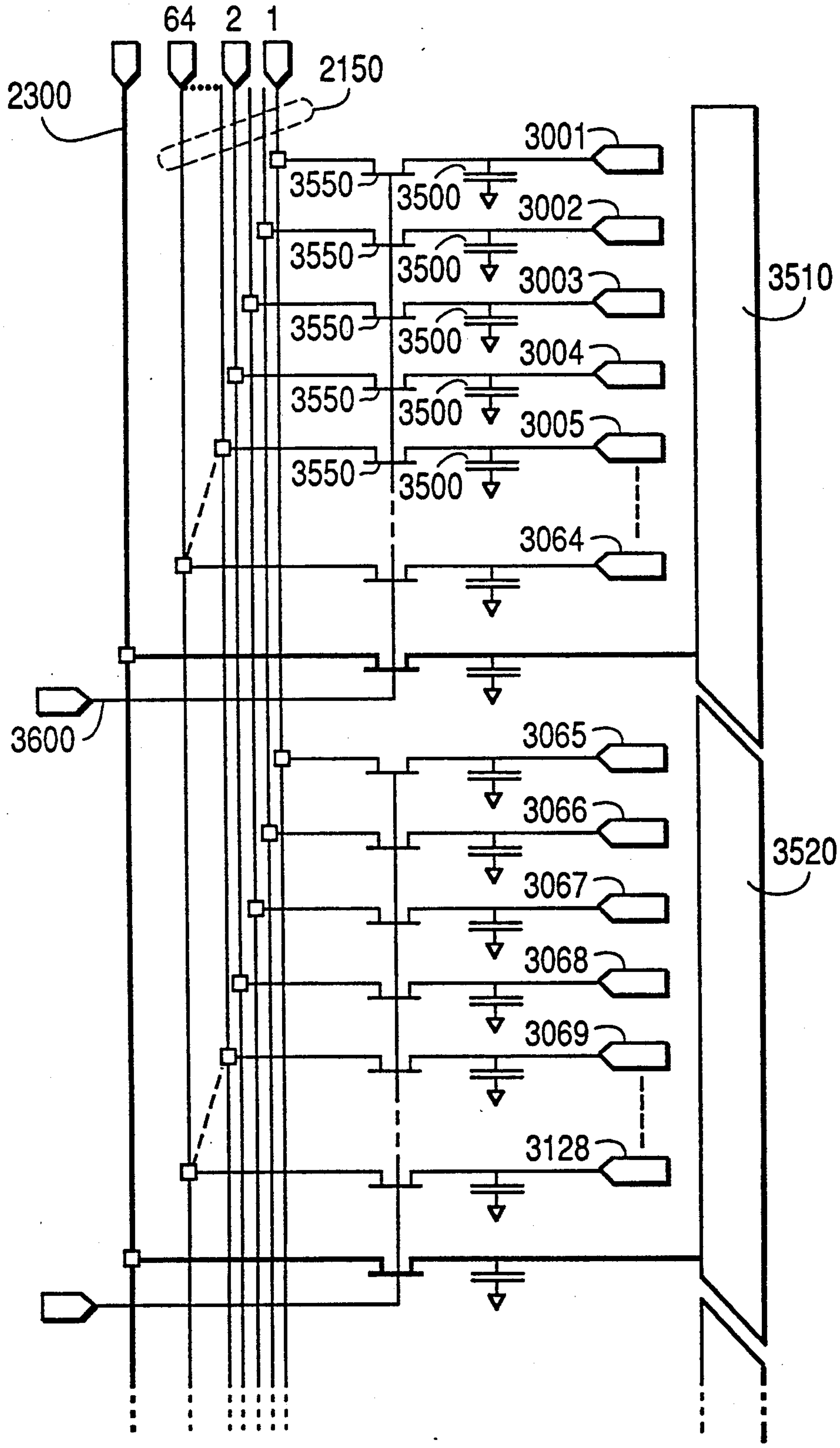
FIG. 3 is a diagram illustrating a portion of the system of FIG. 2 in more detail.

In FIG. 3, which corresponds to circuitry within dotted line rectangle 2700 in FIG. 2, two groups of 64 modulation electrodes are shown, modulation electrodes 3001–3064 and modulation electrodes 3065–3128. To establish potentials on modulation electrodes 3001–3064, for example, controller 1100 sets each of the 64 data lines of data bus 2150 to the voltage level to be stored on the capacitors 3500 associated with each of the modulation electrodes 3001–3064. Subsequently, controller 1100 sets select line 3600 to a voltage causing transistors 3550 to conduct current between capacitors 3550 and the corresponding data bus lines. Once the assigned voltages have been established on capacitors 3500, transistors 3550 are switched to the non conducting state by select line 3600, thereby isolating capacitors 3500 from data bus 2150.

Correction electrode 3510 is in proximity to each modulation electrode in a first group of 64 modulation electrodes, meaning that correction electrode 3510 is sufficiently close to each modulation electrode in the group such that an electric field, in modulation channel 1024 and generated by correction electrode 3510, substantially coincides with the electric field generated by each modulation electrode in the group. Similarly, correction electrode 3520 is in proximity to each modulation electrode in a second group of 64 modulation electrodes. According to the preferred embodiments of the present invention, each correction electrode is updated periodically with each new line of image data, concurrently with a corresponding group of modulation electrodes.

Figure 4:
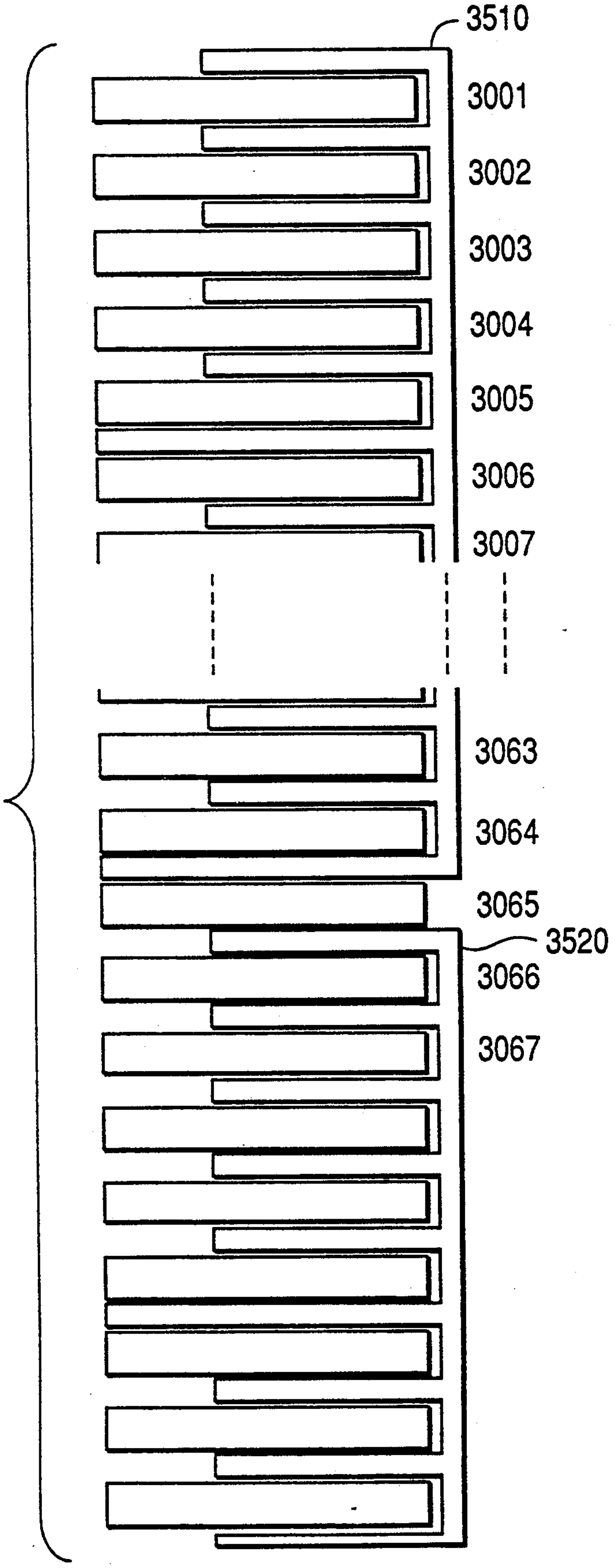
FIG. 4 is a fragmentary cross-section on line 4—4 of FIG. 1 and illustrating correction electrodes according to a first preferred embodiment of the present invention.

FIG. 4, a fragmentary bottom plan view as seen on line 4—4 of FIG. 1, illustrates geometries of the modulation and correction electrodes according to a first preferred embodiment of the present invention. Correction electrode 3510 is interdigitated with each modulation electrode in the first group of 64 modulation electrodes. Thus, the field in the modulation channel opposing each modulation electrode will be a function of both the voltage on the modulation electrode and the voltage on the correction electrode. In FIG. 4, modulation electrode 3065 is surrounded by two different correction electrodes, thereby providing a smooth transition between the applied correction fields from electrodes 3510 and 3520.

Figure 5:
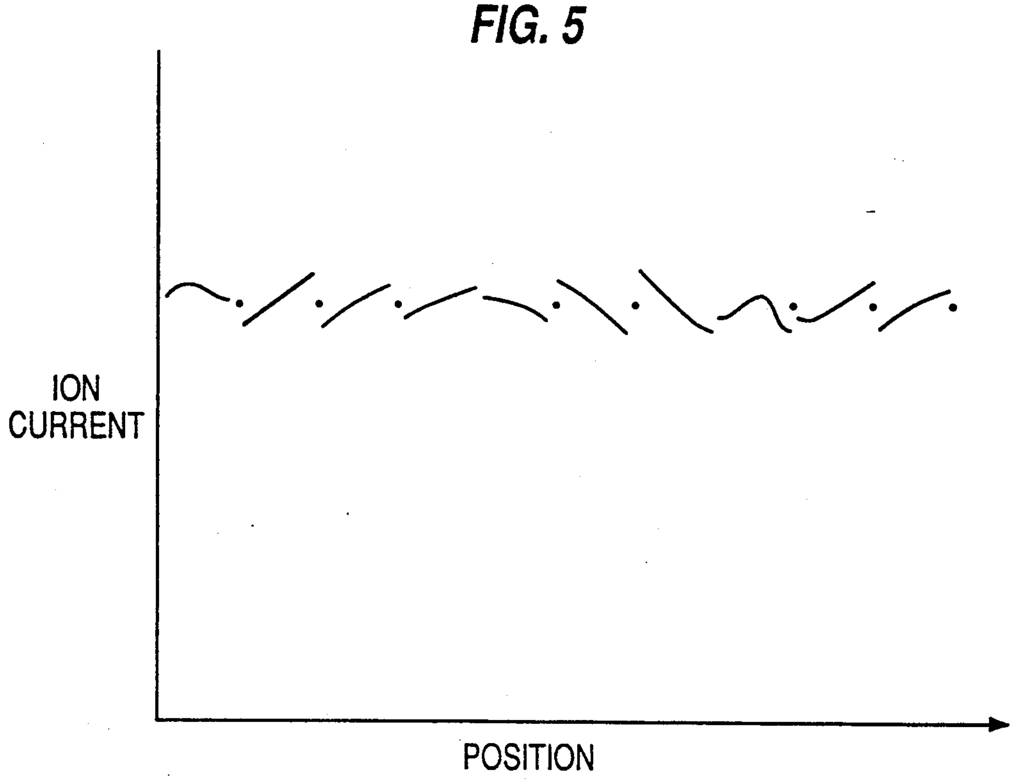
FIG. 5 is a graph illustrating the effect of the performance of one type of correction electrode.

FIG. 5 illustrates ion currents as a function of position along modulation bar 2028 after piecewise correction has been applied.

Figure 6:
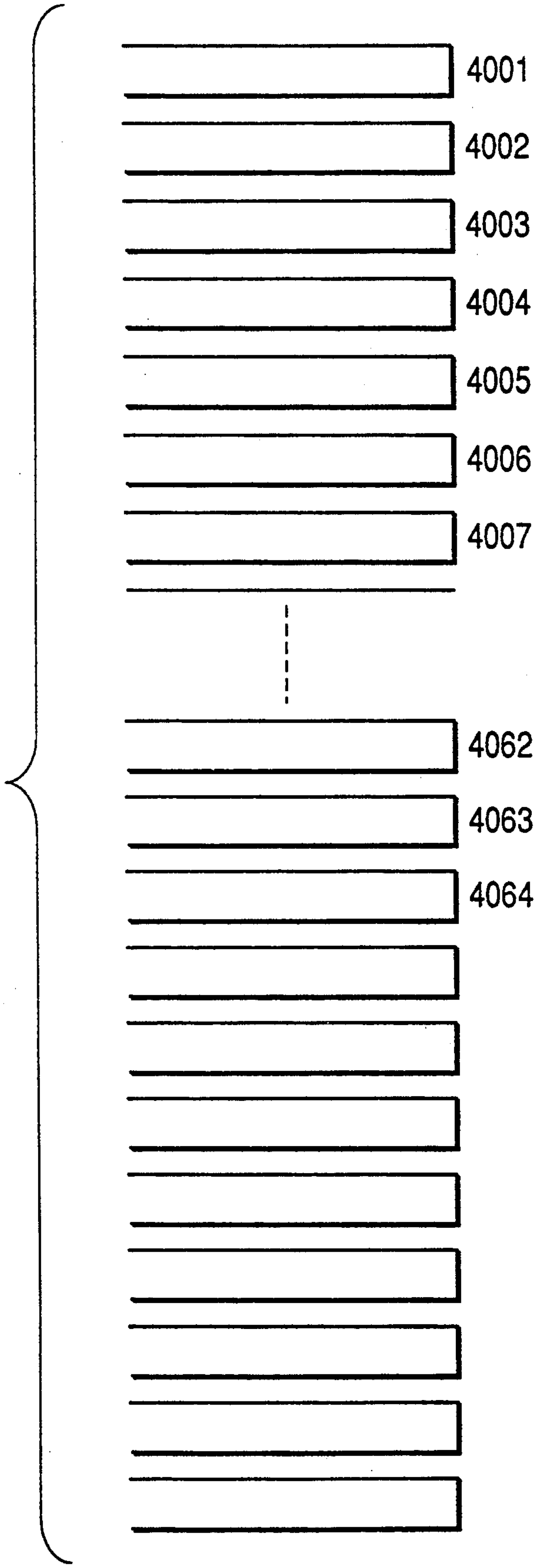
FIG. 6 is a diagram illustrating electrode geometries according to a proposed ionographic print head.

In contrast to FIG. 4, FIG. 6 illustrates a typical geometry of modulation electrodes on a modulation bar without the correction electrodes of the preferred embodiments. In contrast to FIG. 5, FIG. 7 illustrates ion current as a function of position along the length of the modulation bar without the correction applied.

Figure 7:
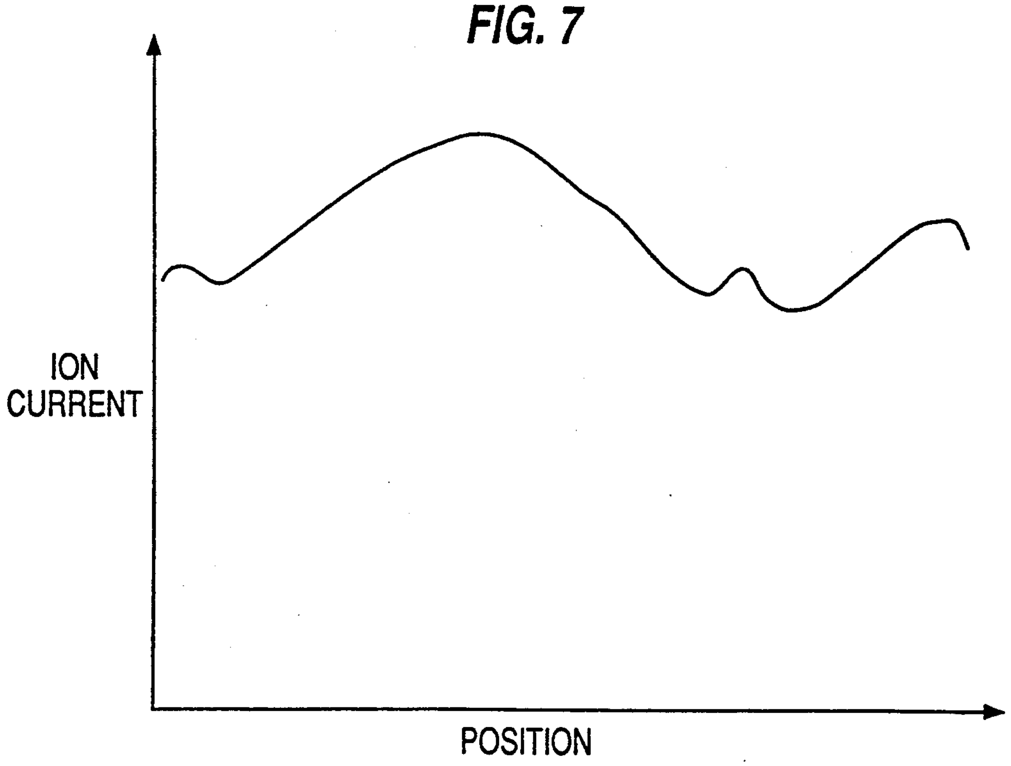
FIG. 7 is a graph illustrating typical ion current for a system having the electrode geometries illustrated in FIG. 4.

When the curve shown in FIG. 7 is corrected as shown in FIG. 5, each curved segment corresponds to a group of 64 adjacent modulation electrodes and their corresponding correction electrode. The curve of FIG. 5 may be conceptualized as a partitioned version of the curve of FIG. 7, with each line segment of the partition shifted by application of a DC bias field.

Figure 8A:
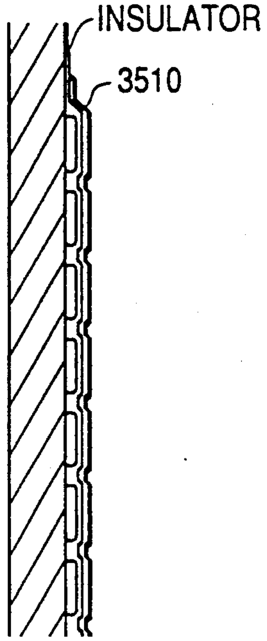
FIG. 8A is a fragmentary cross-section showing correction electrodes according to a second embodiment of the present invention.
Figure 8B:
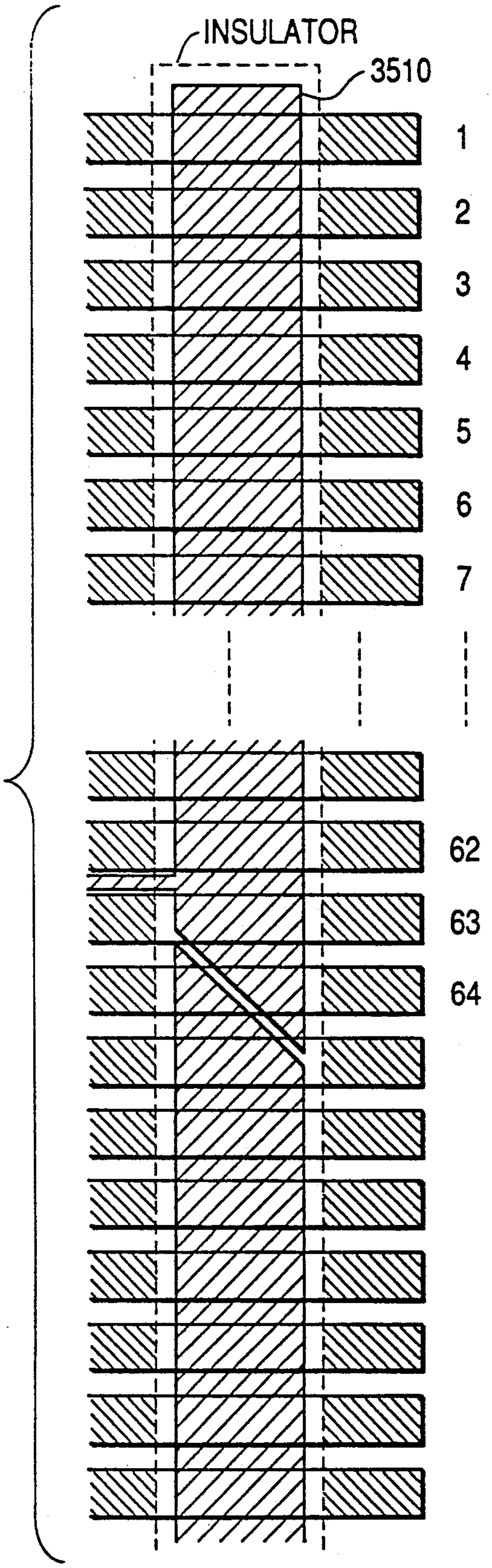
FIG. 8B is a fragmentary plan view of the structure shown in FIG. 8A.

FIG. 8A and 8B show an arrangement of electrodes according to a second preferred embodiment of the present invention. Similar to the first preferred embodiment, the correction electrodes of the second preferred embodiment are arranged on the same side of the modulation channel as the modulation electrodes. In contrast to the first preferred embodiment, each correction electrode is opposed to an associated group of modulation electrodes and electrically separated from the modulation electrodes by a thin insulating layer. The structure of the insulating layer is essentially similar to that of crossovers on thin film structures.

In FIGS. 8B, the ends of each correction electrodes are angled and are parallel to angled ends of an adjacent correction electrodes. This angled arrangement allows for a longer transition region than the arrangement of the first preferred embodiment.

In contrast to FIG. 4, in which the electric field in the modulation channel 1024 is composed of a coexisting superposition of fields from the modulation and control electrodes respectively, in FIGS. 8A and 8B the correction electrodes are superimposed over the modulation electrodes such that the electric fields from those portions of the modulation electrodes that are covered by correction electrodes are rendered ineffective in influencing ion flow in the modulation channel. Ions flowing through modulation channel 1024 are, therefore, acted upon sequentially, first encountering the fields of the correction electrodes and then encountering the fields of the uncovered portions of the modulation electrodes. This sequential action can be conceptualized as a piecewise adjustment of the input ion flow density before it is acted upon in the chamber portion dominated by the modulation electrode fields.

The roles of correction and modulation can be reversed, such that the ions are first modulated and then corrected for overall uniformity, by instead locating the correction electrode downstream in the modulation channel from the modulation electrodes. In this latter configuration there is no need to provide an insulation layer since the modulation electrodes can be terminated slightly ahead of the region occupied by the correction electrodes which can then be affixed directly to the common substrate.

Figure 9:
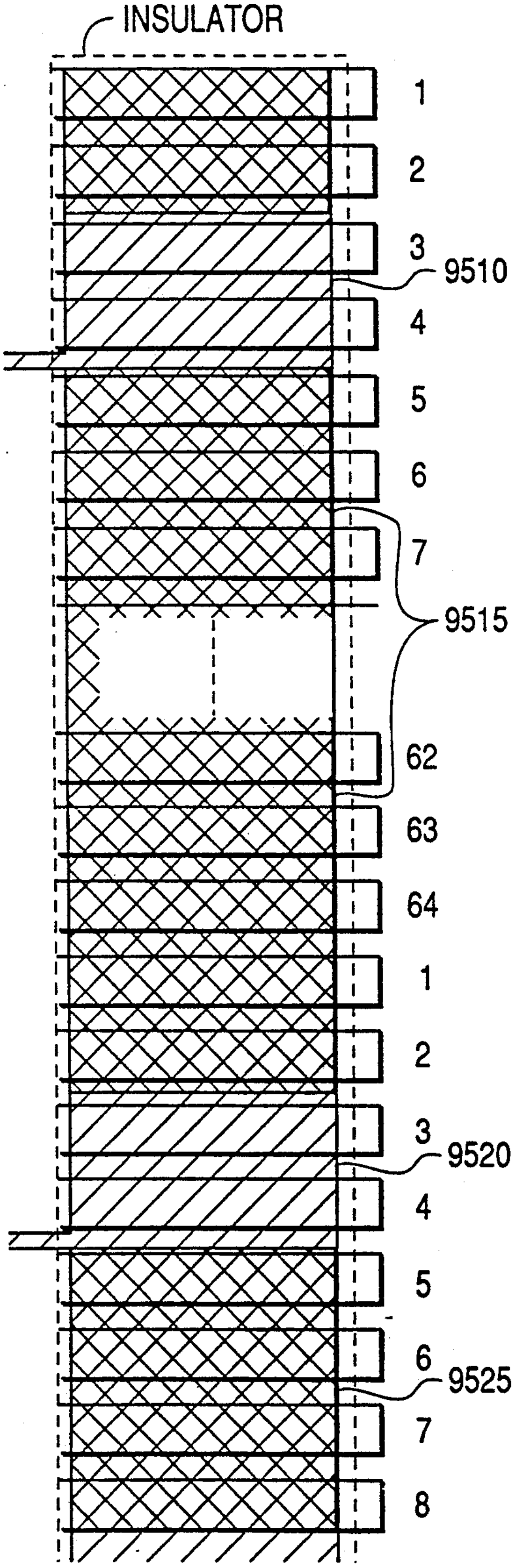
FIG. 9 is a fragmentary schematic plan view illustrating correction electrodes according to a third preferred embodiment of the present invention.

FIG. 9 shows an arrangement of electrodes according to a third preferred embodiment of the present invention. In the third preferred embodiment, each correction electrode has two portions, such as conductor portion 9510 and a resistive ribbon portion 9515. Conductor portion 9510 is fabricated of a highly conductive material, such as metal. The resistive ribbon portion functions as a voltage divider between conductor portion 9510 and conductor portion 9520 of an adjacent correction segment. The arrangement of the third preferred embodiment allows for a gradual change in correction field between adjacent correction voltage application points. More specifically, conductor portion 9510 contacts one end of resistive ribbon portion 9515, which is superimposed over modulation electrodes in the first group of 64 modulation electrodes. Conductor portion 9520 contacts the other end of resistive ribbon portion 9515. Thus, ion flow associated with modulation electrodes at intermediate positions along resistive ribbon portion 9515 will receive correction voltages intermediate between voltages on conductor portions 9510 and 9520.

In other words, each correction electrode includes a first portion having a first length and a first resistivity, and a second portion having a length longer than the first length and a resistivity higher than the first resistivity, and the means for blending the effect of adjacent correction electrodes includes an electrical coupling between the second portion of one correction electrode and the first portion of another correction electrode.

In contrast to the first and second embodiments, the third preferred embodiment requires that a current be supplied to maintain the potential at each metal contact. However, the required current can be relatively small. In normal operation, the resistive ribbon portions establish static repulsive electric fields resulting in negligible ion current loads. Thus ribbon resistances in the megohm range drawing operating currents in the microamp range should be sufficiently robust to ensure stable operation.

Figure 10A:
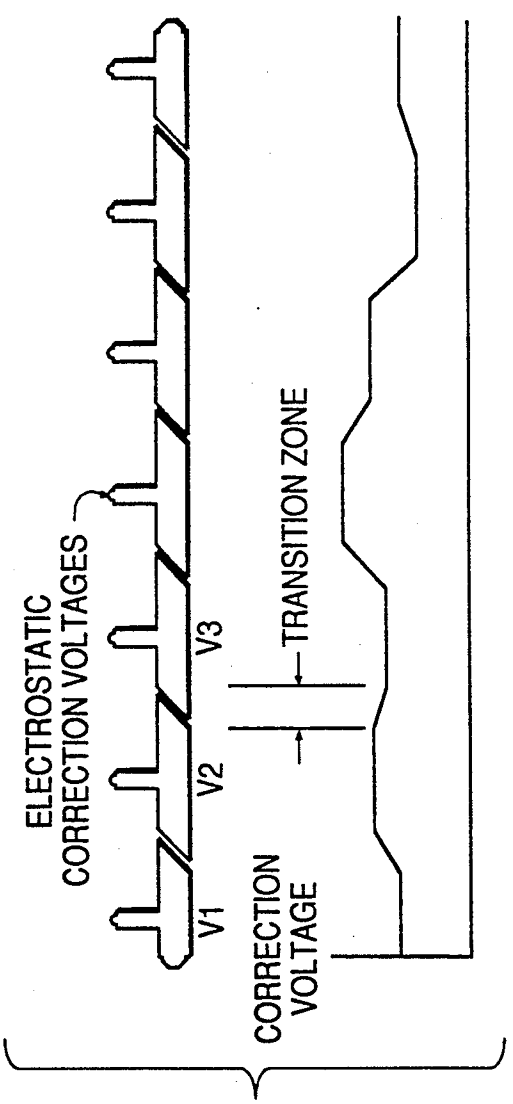
FIG. 10 is a diagram comparing the second and third embodiments of the present invention.
Figure 10B:
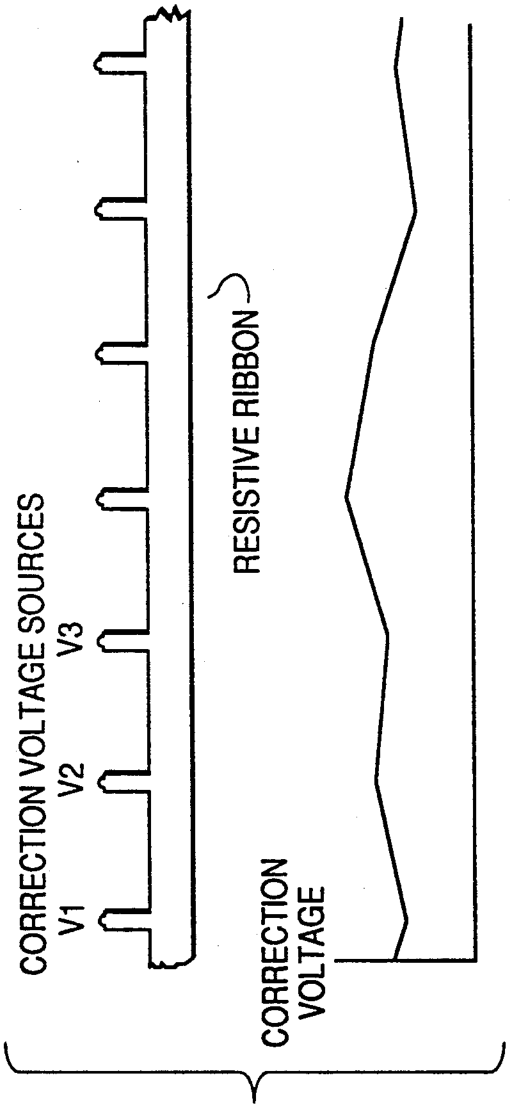

FIGS. 10(*a*) and 10(*b*) compare correction fields applied by the second and third preferred embodiments, respectively In FIG. 10(*a*), the sloped portions correspond to the width of the angled ends of the correction electrodes of the second embodiment. In contrast, FIG. 10(*b*) shows continuously sloped portions corresponding to the spans of resistive ribbon between the contacting electrodes of the third embodiment.

In the third embodiment, the roles of the correction and modulation electrodes can be reversed, as explained previously in connection with the second preferred embodiment, thereby eliminating the need for the insulation layer.

One advantage of the embodiments discussed above is that by fabricating the correction electrode structure on the same substrate as the individual modulation electrodes, the correction electrodes can be addressed using a simple extension of the thin film transistor network that supplies the modulating electrodes, provided that each strobe line also controls an additional thin film transistor supplying the control voltage to the correction electrode for that group.

An alternative to the embodiments discussed above is to fabricate a correction electrode structure in place of the opposing conductive wall 1050 forming the narrow exit path of FIG. 1 that serves as a common ground plane for all modulation electrodes denoted by 1028 in FIG. 1.

In this alternative embodiment, the correction potential distribution network must absorb the ion current deflected into the structure, which would be conducted away by ground plane 1050 in the preferred embodiments discussed above. If the potential distribution network has a similar structure as in the embodiments discussed above, this absorption can be accomplished by updating the applied correction potentials as frequently as necessary.

Since an opposing segmented ground plane would be both physically and electrically separate from the modulation electrode structure, each can be updated independently of the other without interference. Depending on the design, the period for updating the correction electrodes may be the same as the period for updating the modulating electrodes, or may be shorter or longer, depending on the storage capacitance associated with each correction electrode.

In the embodiments described above there is one correction electrode per group. Alternatively, a common correction electrode could be provided for each pair of adjacent groups. This common arrangement would result in half as many correction segments as shown in the preferred embodiments, and use only one correction electrode transistor for each pair of groups rather than one per group. Alternatively, additional analog lines and D/A converters would allow multiple correction segments per group, resulting in shorter segments in the graph of FIG. 5.

Figure 11:
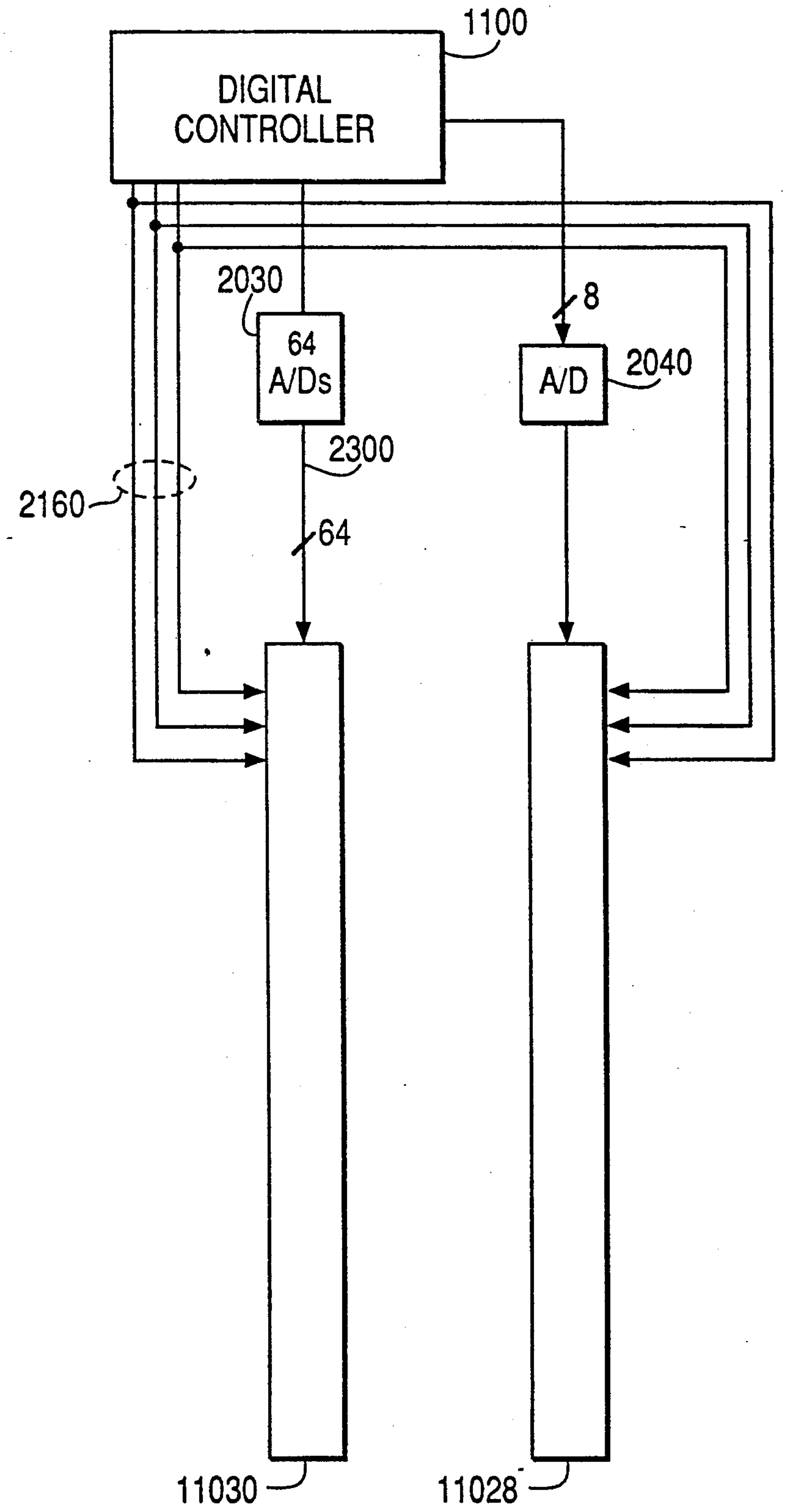
FIG. 11 is a diagram of a system for controlling electrodes according to an alternative embodiment of the present invention.

Since correction electrodes fabricated on the opposing wall of the modulation channel 1024 are both physically and electrically independent of the modulation structure 1028, they may be organized in a wide variety of ways. Having the correction electrodes residing on a different substrate than the modulation bar makes the modulation bar less complicated, and may have advantages in terms of manufacturing yield of the modulation bar. FIG. 11 is a diagram of a system for controlling this alternative embodiment of the present invention. In FIG. 11, the correction electrodes reside on correction array 11028, instead of on modulation bar 11030.

Figure 12:
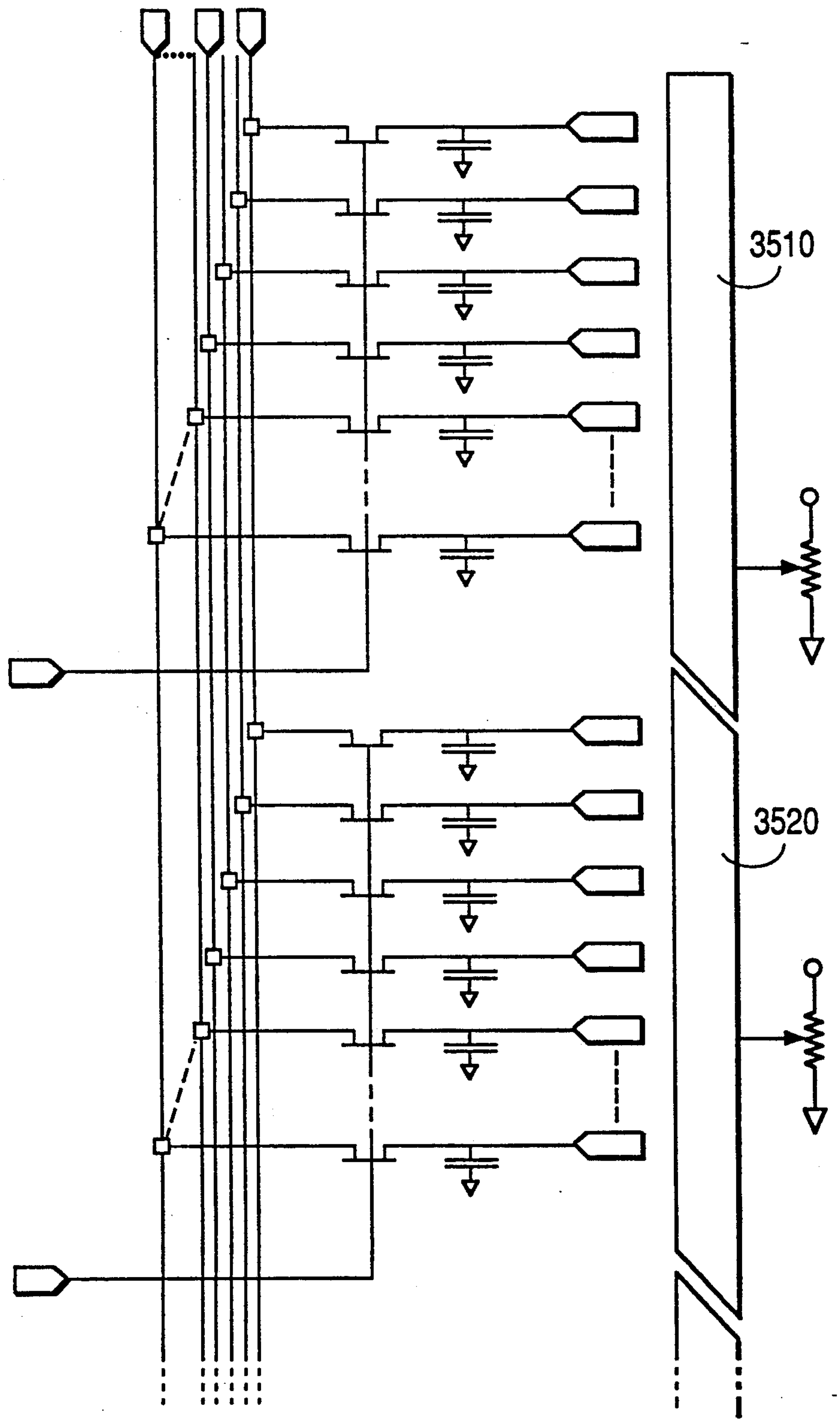
FIG. 12 is a diagram of a circuit for controlling correction electrodes according to an alternative embodiment of the present invention.

Further, the present invention could be embodied in alternative approaches to applying the correction voltages to each correction electrode. For example, 40 parallel low power DC potential sources could be connected directly to the correction electrodes, in which case there is no need for an updating period at all. Further, instead of applying the voltages from a digital to analog converter, the voltage for each correction electrode could be applied from a resistive voltage divider network trimmed at the time of manufacture or periodically in the field. This latter approach is illustrated schematically in FIG. 12.

Although the preferred embodiments discussed above have multiple modulation electrodes for each correction electrode, the invention can also be practiced with a one-to-one correspondence between modulation and correction electrodes. In general, for controlling ion flow, each modulation electrode will be coupled to a means for charging the modulation electrode to one of a first set of voltage potentials, and each correction electrode will be coupled to a means for charging the correction electrode to one of a second set of voltage values. The size of the second set of voltage values is larger than the size of the first set of voltage values, as exemplified in the preferred embodiments where each correction electrode is charged to one of 256 voltage values while each modulation electrode is charged to one of 4 voltage values.

For details regarding additional aspects of ionographic printing systems, see U.S. Pat. No. 4,524,371 to Sheridon et al., U.S. Pat. No. 4,463,363 to Gundlach et al., U.S. Pat. No. 4,538,163 to Sheridon, U.S. Pat. No. 4,644,373 to Sheridon et al., U.S. Pat. No. 4,737,805 to Weisfield et al., and U.S. Pat. No. 4,972,212 to Houser al. The contents of each of these U.S. patents are herein incorporated by reference. Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. A subassembly for an apparatus for selectively delivering ion currents comprising:
   - a first wall;
   - a first plurality of electrodes arranged on the first wall;
   - a second plurality of electrodes arranged on the first wall and adjacent to the first plurality of electrodes;
   - a second wall, opposed to the first and second pluralities of electrodes to define a channel therebetween,
   - means for generating a flow of ions in the channel;
   - a first correction electrode, sufficiently close to each of the electrodes in the first plurality of electrodes such that an electric field generated by the first correction electrode substantially coincides with an electric field generated by each of the electrodes in the first plurality of electrodes, to influence the flow of ions within the channel; and
   - a second correction electrode, sufficiently close to each of the electrodes in the second plurality of electrodes such that, within the channel, an electric field generated by the second correction electrode substantially coincides with an electric field generated by each of the electrodes in the second plurality of electrodes, to influence the flow of ions within the channel.

2. The subassembly as in claim 1, wherein the first and second correction electrodes are on an opposite side of the channel from the second wall.

3. The subassembly as in claim 1, wherein the first and second correction electrodes are on a same side of the channel as the first and second pluralities of electrodes.

4. The subassembly as in claim 3, wherein the first correction electrode is interdigitated with the first plurality of electrodes.

5. The subassembly as in claim 3, wherein the first correction electrode is opposed to the first plurality of electrodes.

6. The subassembly as in claim 1, further including
   - means for blending an effect of the first and second correction electrodes.

7. The subassembly as in claim 6, wherein the means for blending includes
   - a tapered portion of the first correction electrode opposing a tapered portion of the second correction electrode.

8. The subassembly as in claim 6, wherein the first and second correction electrodes each include a first portion having a first length and a first resistivity; and a second portion having a length longer than the first length and a resistivity higher than the first resistivity, and wherein the means for blending includes an electrical coupling between the second portion of the first correction electrode and the first portion of the second correction electrode.

9. A subassembly for an apparatus for selectively delivering ion currents comprising:

a first wall;

a first charge holding means for holding a charge, the first charge holding means being on the first wall;

a second charge holding means, for holding a charge, the second charge holding means being adjacent to the first charge holding means on the first wall;

a second wall, opposed to the first wall to define a channel therebetween, means for generating a flow of ions in the channel;

first means for charging the first charge holding means to one of a first set of voltage values and for charging the second charge holding means to one of the first set of voltage values;

a third charge holding means for holding a charge, the third charge holding means being sufficiently close to the first charge holding means such that an electric field generated by the third charge holding means substantially coincides with an electric field generated by the first charge holding means, to influence the flow of ions in the channel;

a fourth charge holding means for holding a charge, the fourth charge holding means being sufficiently close to the second charge holding means such that an electric field generated by the fourth charge holding means substantially coincides with an electric field generated by second charge holding means; and second means for charging the third charge holding means to one of a second set of voltage values, a size of the second set of voltage values being larger than a size of the first set of voltage values, and for charging the fourth charge holding means to one of the second set of voltage values.

10. The subassembly as in claim 9, wherein the first charging means includes a digital to analog converter selectively coupled to either the first charge holding means or the second charge holding means.

11. A subassembly for an apparatus for selectively delivering ion currents comprising:

a wall;

a first plurality of electrodes arranged on the wall;

a second plurality of electrodes arranged on the wall and adjacent to the first plurality of electrodes;

a first correction electrode, interdigitated with the first plurality of electrodes; and a second correction electrode, interdigitated with the second plurality of electrodes.

12. The subassembly apparatus as in claim 11, wherein the first and second correction electrodes each include a first portion having a first length and a first resistivity; and a second portion having a length longer than the first resistivity; and a second portion having a length longer than the first length and a resistivity higher than the first resistivity, and wherein the means for blending includes an electrical coupling between the second portion of the first correction electrode and the first portion of the second correction electrode.

13. A subassembly for an apparatus for selectively delivering ion currents comprising:

a wall;

a first plurality of electrodes arranged on the wall;

a second plurality of electrodes arranged on the wall and adjacent to the first plurality of electrodes;

a first correction electrode, opposed to the first plurality of electrodes; and a second correction electrode, opposed to the second plurality of electrodes.

14. The subassembly as in claim 13, wherein the first and second correction electrodes each include a first portion having a first length and a first resistivity; and a second portion having a length longer than the first length and a resistivity higher than the first resistivity, and wherein the second portion of the first correction electrode is electrically coupled to the first portion of the second correction electrode.

15. A method of operating a subassembly for an apparatus for selectively delivering ion currents, the apparatus having a first wall, first charge holding means for holding a charge, the first charge holding means being on the first wall, second charge holding means, for holding a charge, the second charge holding means being adjacent to the first charge holding means on the first wall, a second wall, opposed to the first wall to define a channel therebetween, means for generating an ion flow in the channel, a third charge holding means for holding a charge, the third charge holding means being sufficiently close to the first charge holding means such that an electric field generated by the third charge holding means substantially coincides with an electric field generated by the first charge holding means, to influence the flow of ions in the channel and a fourth charge holding means for holding a charge, the fourth charge holding means being sufficiently close to the second charge holding means such that an electric field generated by the fourth charge holding means substantially coincides with an electric field generated by the second charge holding means, to influence the flow of ions in the channel the method comprising the steps of:

charging the first charge holding means to one of a first set of voltage values;

charging the second charge holding means to one of the first set of voltage values;

charging the third charge holding means to one of a second set of voltage values, the second set of voltage values being larger than the first set of voltage values; and charging the fourth charge holding means to one of the second set of voltage values.

* * * * *